Patented Oct. 16, 1945

2,387,049

UNITED STATES PATENT OFFICE 2,387,049

MODIFIED SHELLAC PRODUCT AND METHOD FOR MAKING SAME

Henry Hall Bassford, Jr., Brooklyn, N. Y., assignor to U. S. Shellac Importers Association, Inc., New York, N Y., a corporation of New York No Drawing. Application May 15, 1942,
Serial No. 443,168

5 Claims. (Cl. 260—102)

This invention relates to new compositions of matter, and more particularly to synthetic resins, prepared by heating shellac with urea and to water-resistant aqueous varnishes, adhesives, sizes and paints prepared therefrom.

This invention is based upon the discovery that it is possible to prepare fusible soluble products by the reaction between shellac and urea at elevated temperatures. For years urea has been proposed as a component with shellac, the teachings being that urea acts as a useful polymerization agent in the production of insoluble and generally infusible shellac products. These products have therefore been proposed for use in plastic molding compositions. (Indian Lac Research Institute, Research Note 14 (1934) and Bulletin 30 (1938); British Plastics 10, 626 (1939).) I have discovered that, when the amount of urea heated with shellac is increased until the weight of urea exceeds 25% of the weight of the shellac, that an unexpected result, contrary to the teachings in the art, is secured, i. e., a fusible resin is obtained which is capable of being dissolved in an aqueous alkaline solution and in various organic solvents.

Examination of the art cited above shows that in the case of those compositions formed by the reaction of shellac with urea as the sole reactant, the weight of urea used has been limited to 6% based on the weight of the shellac. In conjunction with formaldehyde, which reacts with part of the urea used, up to 22% urea (based on the shellac) has been employed. The products, however, which were prepared at temperatures above 110° C. were described as insoluble, infusible resins, and could have no utility in the preparation of varnishes, paints and the like.

The use of urea as a constituent of alcohol shellac varnish has also been disclosed (Syn and App Finish 5 161 (1934)). However the product of reaction between shellac and urea in alcohol solution is very unstable and is readily decomposed by pouring the alcohol solution into water. Films made from the aqueous ammonia solution of these products possess practically no water resistance and, if the weight of urea employed equals 3% of the weight of the shellac, the films are frosted with unchanged urea which crystallizes during drying. If the product obtained by the reaction of shellac and 3% of its weight of urea in alcohol is heated to 150° C., which temperature I have found suitable for preparing the resins described in this application, the product polymerizes immediately to an infusible, insoluble gel.

My experiments have repeatedly confirmed that when shellac is heated with amounts of urea less than 25% of the weight of the shellac, the urea acts as a polymerization agent, apparently catalyzing the reaction of shellac with itself to form rubbery infusible and insoluble gels. On the other hand, the preparations described later in this application illustrate that, if a larger percentage of reactant is used, for example, equal parts by weight of urea and shellac, the product obtained by reaction at a temperature above 110° C. is a homogeneous thermoplastic resin, soluble in aqueous and organic solvents.

The unique chemical structure of shellac has imparted special properties to its solutions in aqueous alkali, which properties have made these solutions practically irreplaceable for such uses as hat stiffeners, leather and shoe dressings, photoengraving solutions, as well as for certain types of inks, paper sizes, floor waxes and the like. Air-dried films obtained from these aqueous alkaline shellac solutions, however, have the disadvantage of possessing little or no adhesion or water resistance. In addition, films prepared from solutions containing native shellac are cloudy due to suspended wax and are lacking in gloss and smoothness of surface.

This invention has, therefore, as one object, the preparation of new and valuable compositions of matter, particularly modified shellac, resins capable of yielding water resistant films from their solution in aqueous media. A second object is the conversion of native shellac directly to a wax-free resin without the need for a difficult and costly filtering or extracting operation. A third object is the preparation of aqueous varnishes, adhesives, and sizes, from these new resins. A fourth object is the manufacture of paints, inks, and the like from said varnishes.

The first of these objects is accomplished by adding bleached shellac to at least one-fourth its weight of molten urea and allowing the mixture to react, as evidenced by evolution of gaseous ammonia, at a temperature of at least 110° C.

The second object is accomplished by adding a native shellac (for example TN orange) to at least one-fourth its weight of molten urea and heating together at a temperature of at least 160° C.

The third object is attained by dissolving the resinous product obtained in water containing sufficient ammonia or other alkali to produce a clear uniform varnish.

The fourth object is achieved by incorporating suitable pigments in the varnishes prepared above.

In this application "shellac" is taken to include all forms of lac, the secretion of the insect *Tachardia lacca* Kerr, whether in raw, refined or manufactured form. Modified lac is taken to include all forms of lac which have been materially modified by chemical means. "Bleached shellac" includes all forms of lac which have been decolorized by a bleaching process, and include such products as "white lac," refined bleached shellac, "decolorized hard lac," etc.

The terms "aqueous varnish," "aqueous adhesive" and "aqueous size" are used to define a uniform solution prepared by dissolving a reaction product of the shellac-urea type in water to which has been added a solubilizing agent. The latter may be either an alkaline material such as ammonia, borax, triethanolamine, morpholine, and the like, or an organic solvent such as an aliphatic alcohol, or a phenol or, a ketone, or any suitable mixture thereof. The solutions may also contain additional materials, such as plasticizers, wetting agents, anti-foam agents, preservatives, as well as other resinous or drying oil compositions.

The terms "aqueous paint" and "aqueous ink" are intended to define varnishes of the type already described to which have been added suitable pigments, extenders, toners and the like, in such ratio to the prescribed vehicle, as to give the desired surface appearance. It has been found that pigments of the non-reactive type such as zinc sulfide, titanium dioxide, iron oxides, (sienna, black, yellow and amber), phthalocyanines, (blue and green), carbon black and the like are suitable for incorporation in these varnishes. These pigments may be extended with talc, barium sulfate, colloidal silica and mica. Reactive pigments such as calcium carbonate and zinc oxide may not be used where the paint or ink is to be stored for any length of time prior to use. It has been found that flat paints of satisfactory appearance and durability can be prepared by the use of 1 to 2 volumes of pigment per unit volume of non-volatile binder. At lower pigment-binder ratios it is possible to prepare paints which yield very tough, adherent films, and which, unlike any of the present commercial water paints, possess a gloss finish.

The following examples, in which parts are given by weight, are illustrative of my invention:

*Example 1.*—Melt 100 g. of urea and heat the molten product to 110–150° C. Then, with vigorous agitation, and maintaining the temperature of the melt preferably between 150–160° C., add 200 g. of orange flake shellac (superfine grade) in small, approximately equal portions, over a twenty minute period. This shellac contains wax. The mixture, thus obtained should be stirred and heated for an additional ten minutes at 150–160° C. to insure complete solution of the shellac in the molten urea. The reaction product is then cooled.

The resulting resin is readily soluble in dilute aqueous ammonia, and a usable aqueous varnish or adhesive can be prepared by dissolving 270 g. of the product in 350 cc. of water containing 12 cc. of 28° Bé. aqueous ammonium hydroxide. Films from this varnish possess a dull waxy surface, typical of films prepared from solutions of native shellac in aqueous alkalies. This effect is due to the fact that the shellac wax is completely insoluble in the aqueous alkaline solution and is therefore deposited in the shellac film as a separate phase.

A resin capable of yielding clear, glossy, wax-free films can be obtained, however, by a slight modification of the cooking technique. If, after all of the shellac has been dissolved in the molten urea, the solution is heated at about 170° C. for ten minutes, the product obtained is essentially wax-free. Apparently the wax reacts with the urea at temperatures above 160° C. to form reaction products soluble in both the aqueous ammonium hydroxide and in the resin film obtained upon evaporation of this solution.

*Example 2.*—Melt 100 parts of urea and heat to 150° C. Then add 120 parts of dewaxed bleached shellac portionwise over a period of one and one-half hours. Agitate the molten mixture vigorously to insure rapid dissolution of the shellac therein and maintain the temperature between 145 and 155° C. After the addition of shellac is complete, continue heating and stirring, keeping the temperature at 150° C. for another hour. The resulting product solidifies on cooling to a greasy, slightly plastic solid, which is fairly tough but weak against shock. Except for a few small lumps, which result from urea-catalyzed polymerizations of the larger shellac particles before the latter can dissolve in the molten urea, the product is generally completely soluble in alcohol or dilute aqueous ammonia.

The shellac-urea resin is readily freed from unreacted urea by extracting the product several times with boiling water. The resulting product may then be further purified by dissolving it in alcohol or dilute aqueous alkaline solution and filtering to remove the insoluble polymerized material.

The purified product may then be dissolved in aqueous ammonium hydroxide to form a clear aqueous varnish. The latter may be pigmented with ZnS, talc extended TiO$_2$, iron oxide, chromium oxide, and the like, to form aqueous paints.

In a typical formulation 100 parts of a dried purified shellac-urea product prepared in the manner already described were dissolved in 250 parts of warm water containing 5 parts of 28° Bé. aqueous ammonium hydroxide. The resulting aqueous solution was suitable for preparing films by brushing, dipping, pouring or spraying, the resulting film being either detached or affixed to a base such as paper, metal, glass or wood. Films prepared on metal and glass, dried to touch in less than one hour. After air-drying for five days, the films withstood 24 hours water soaking without detaching themselves from the base. The films softened and whitened somewhat. After one hour's drying, the films regained their hardness but retained a faint permanent blush. Films prepared using an aqueous ammonium solution of shellac and air-dried five days, completely disintegrated after 15 minutes water immersion.

120 parts of the solution were pigmented with 100 parts of 50% ZnS (50% BaSO$_4$). The resulting paste paint was readily thinned with water to any desired brushing consistency. Films from this paint were applied to tinned iron and evaluated by a wet abrasion test similar to that used in testing "Resin emulsion paints," described in Federal Specification TT P-88. The paint films withstood 500 swipes by this test after 5 days air-drying.

Having described my invention, what I claim and desire to secure by Letters Patent, is as follows:

1. A resin prepared by heating a mixture consisting of shellac and urea, the urea in the mixture being at least one-fourth that of the weight of the shellac at a temperature of approximately 140°–180° C.

2. A resin capable of yielding water resistant films from its solution in aqueous media, prepared by heating a mixture consisting of bleached shellac, and urea, the urea in the mixture being at least one-fourth that of the weight of the shellac at a temperature of approximately 140°–180° C.

3. A resin capable of yielding clear, glossy films from its aqueous alkaline solution prepared by heating a mixture consisting of a native shellac and urea, the urea in the mixture being at least one-fourth that of the weight of the shellac at a temperature of approximately 160°–180° C.

4. A process for preparing a resin capable of yielding water resistant films from its solution in aqueous media which consists in heating a mixture of bleached shellac and urea, the weight of urea in the mixture being at least one-fourth that of the weight of the shellac, at a temperature of approximately 140°–180° C.

5. A process for preparing a resin yielding clear, glossy films from its aqueous alkaline solution which consists in heating a mixture of native shellac and urea, the weight of the urea in the mixture being at least one-fourth that of the weight of the shellac, at a temperature of approximately 160°–180° C.

HENRY HALL BASSFORD, Jr.